United States Patent
Malka

(10) Patent No.: US 11,380,073 B2
(45) Date of Patent: Jul. 5, 2022

(54) METHOD AND SYSTEM FOR ALIGNING A DIGITAL MODEL OF A STRUCTURE WITH A VIDEO STREAM

(71) Applicant: Unity IPR ApS, Copenhagen (DE)

(72) Inventor: Francis Ruben Malka, Saint-Lambert (CA)

(73) Assignee: Unity IPR ApS, Copenhagen (DK)

( * ) Notice: Subject to any disclaimer, the term of this patent is extended or adjusted under 35 U.S.C. 154(b) by 0 days.

(21) Appl. No.: 17/166,598

(22) Filed: Feb. 3, 2021

(65) Prior Publication Data

US 2021/0241535 A1 Aug. 5, 2021

Related U.S. Application Data

(60) Provisional application No. 62/969,537, filed on Feb. 3, 2020.

(51) Int. Cl.
*G06T 19/00* (2011.01)
*G06T 7/73* (2017.01)
*G06T 17/00* (2006.01)

(52) U.S. Cl.
CPC .............. *G06T 19/006* (2013.01); *G06T 7/75* (2017.01); *G06T 17/00* (2013.01)

(58) Field of Classification Search
CPC .......... G06T 7/75; G06T 17/00; G06T 19/006
See application file for complete search history.

(56) References Cited

U.S. PATENT DOCUMENTS

| | | | |
|---|---|---|---|
| 10,497,177 B1 | 12/2019 | Cote et al. | |
| 2014/0267254 A1* | 9/2014 | Sievert | G06T 7/75 |
| | | | 345/420 |
| 2016/0148433 A1* | 5/2016 | Petrovskaya | G02B 27/01 |
| | | | 345/633 |

(Continued)

FOREIGN PATENT DOCUMENTS

WO 2016077798 5/2016

OTHER PUBLICATIONS

"International Application Serial No. PCT/EP2021/052558, International Search Report dated Mar. 23, 2021", 5 pgs.

(Continued)

*Primary Examiner* — Diane M Wills
(74) *Attorney, Agent, or Firm* — Schwegman Lundberg & Woessner, P.A.

(57) ABSTRACT

A method of aligning a digital model of a structure with a displayed portion of the structure within a video stream is disclosed. An approximate position of the camera device in the digital model is determined. A position and an orientation are determined for a plurality of digital surfaces within the digital model visible from the approximate position of the camera device. A position and an orientation of a plurality of object surfaces visible in a video stream are determined. A 3D translation, a 3D scale, and a 3D rotation that maximize an alignment of the position and orientation of the plurality of digital surfaces with the position and orientation of the plurality of object surfaces are determined. The 3D translation, the 3D scale, and the 3D rotation are applied to the digital model and the digital model is displayed contemporaneously with a display of the video stream.

11 Claims, 8 Drawing Sheets

(56) References Cited

U.S. PATENT DOCUMENTS

2019/0051014 A1* 2/2019 Kahle .................... H04N 7/181

OTHER PUBLICATIONS

"International Application Serial No. PCT/EP2021/052558, Written Opinion dated Mar. 23, 2021", 7 pgs.
Marchand, Eric, "Pose Estimation for Augmented Reality: A Hands-On Survey", IEEE Transactions on Visualization and Computer Graphics, vol. 22, No. 12, (Dec. 1, 2016), 2633-2651.
International Application Serial No. PCT/EP2021/052558, International Preliminary Report on Patentability dated Mar. 4, 2022, 5 pgs.

* cited by examiner

METHOD AND SYSTEM FOR ALIGNING A DIGITAL MODEL OF A STRUCTURE WITH A VIDEO STREAM

CROSS-REFERENCE TO RELATED APPLICATIONS

This application claims the benefit of U.S. Provisional Application No. 62/969,537, filed Feb. 3, 2020, entitled "METHOD AND SYSTEM FOR ALIGNING A DIGITAL MODEL OF A STRUCTURE WITH A VIDEO STREAM," which is incorporated by reference herein in its entirety.

TECHNICAL FIELD

The subject matter disclosed herein generally relates to the technical field of computer systems, and in one specific example, to computer systems and methods for aligning a digital model of a structure within a video stream.

BACKGROUND OF THE INVENTION

In architecture and engineering, aligning a digital model of a structure with a real life representation of the structure is an important initial step for building engineers to perform. Global positioning technologies (e.g., such as GPS) capable of locating a device using geospatial coordinates determined from satellites are useful for outdoor positioning but not precise enough for placement of a model nor is the technology useful for indoor positioning.

Furthermore, point cloud matching technologies for aligning digital models can work on a small scale but have trouble when applied to larger scale, such as buildings. As an example, ICP (Interactive Closest Point) is an algorithm that maximizes the alignment of two point clouds in space. Also, point cloud matching technologies are not able to differentiate between many similar locations within a structure. For example, recognizing the shape of a door or a window from a camera within a building is not sufficient to know the specific door or window of the building the camera is pointed at.

Other technologies such as motion capture trackers and image markers allow the alignment of a model with a scene, but these technologies require 1) to have physical markers placed in the scene, and 2) modification of the structure model to specify the location of markers within the model so the model and the scene can be aligned. Some of the technologies use images of the scene as trackers, but the images only work in similar lighting conditions and the tracking images must also be placed in the digital model to enable alignment.

BRIEF DESCRIPTION OF THE DRAWINGS

Features and advantages of example embodiments of the present invention will become apparent from the following detailed description, taken in combination with the appended drawings, in which.

It will be noted that throughout the appended drawings, like features are identified by like reference numerals.

DETAILED DESCRIPTION

Figure 1A:
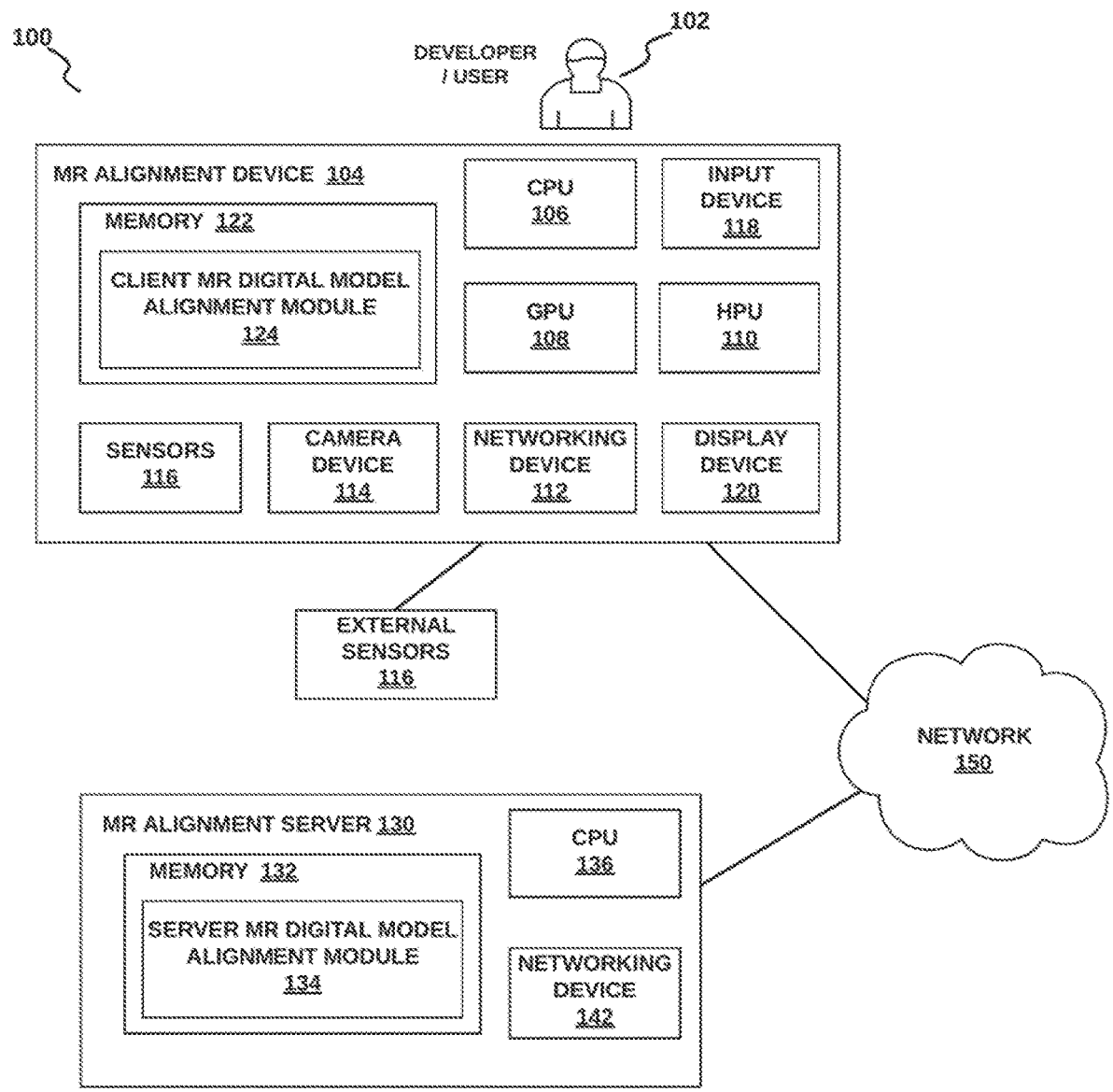
FIG. 1A is a schematic illustrating a MR digital model alignment system, in accordance with one embodiment.

The description that follows describes example systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the inventive subject matter. It will be evident, however, to those skilled in the art, that various embodiments of the inventive subject matter may be practiced without these specific details.

The term 'environment' used throughout the description herein should be understood to include 2D digital environments (e.g., 2D video game environments, 2D simulation environments, 2D content creation environments, and the like), 3D digital environments (e.g., 3D game environments, 3D simulation environments, 3D content creation environments, virtual reality environments, and the like), and augmented reality environments that include both a digital (e.g., virtual) component and a real-world component.

The term 'digital object', used throughout the description herein is understood to include any digital object or digital element within an environment. A digital object can represent (e.g., in a corresponding data structure) almost anything within the environment; including 3D models (e.g., characters, weapons, scene elements (e.g., buildings, trees, cars, treasures, and the like)) with 3D model textures, backgrounds (e.g., terrain, sky, and the like), lights, cameras, effects (e.g., sound and visual), animation, and more. The term 'game object' may also be understood to include linked groups of individual game objects. A digital object is associated with data that defines properties and behavior for the object.

The terms 'asset', 'game asset', and 'digital asset', used throughout the description herein are understood to include any data that can be used to describe a digital object or can be used to describe an aspect of a digital project (e.g., including: a game, a film, a software application). For example, an asset can include data for an image, a 3D model (textures, rigging, and the like), a group of 3D models (e.g., an entire scene), an audio sound, a video, animation, a 3D mesh and the like. The data describing an asset may be stored within a file, or may be contained within a collection of files, or may be compressed and stored in one file (e.g., a compressed file), or may be stored within a memory. The data describing an asset can be used to instantiate one or more digital objects within an environment (e.g., a game) at runtime.

The terms 'client' and 'application client' used throughout the description herein are understood to include a software client or software application that accesses data and services on a server, including accessing over a network.

The term 'mixed reality' or 'MR' used throughout the description herein should be understood to include all combined environments in the spectrum between reality and virtual reality (VR) including virtual reality, augmented reality (AR) and augmented virtuality (AV).

A method of aligning a digital model of a structure with a displayed portion of the structure within a video stream captured by a camera device is disclosed. An approximate position of the camera device in the digital model is determined. A position and an orientation are determined for a plurality of digital surfaces within the digital model visible from the approximate position of the camera device. A video stream is received from the camera device. A position and an orientation of a plurality of object surfaces visible in the video stream are determined. A 3D translation, a 3D scale, and a 3D rotation that maximize an alignment of the position and orientation of the plurality of digital surfaces with the position and orientation of the plurality of object surfaces are determined. The 3D translation, the 3D scale, and the 3D rotation are applied to the digital model and the digital model is displayed contemporaneously with a display of the video stream.

The present invention includes apparatuses which perform one or more operations or one or more combinations of operations described herein, including data processing systems which perform these methods and computer readable media which when executed on data processing systems cause the systems to perform these methods, the operations or combinations of operations including non-routine and unconventional operations or combinations of operations.

A mixed reality (MR) digital model alignment system and associated methods are described herein. The MR digital model alignment system is configured to align a digital model of a structure with a representation of the structure within a video captured by a camera on a MR capable device wherein the camera is positioned to capture the real-world structure within an MR environment and whereby there are no predefined markers. In an example embodiment, a user (e.g., a wearer of a head mounted display (HMD), or someone holding a smartphone, tablet, or other MR-capable device) experiences the MR environment as presented by the MR digital model alignment system via an MR capable device. The MR environment includes a view of the real world (e.g., immediate surroundings of the MR capable device) along with virtual content provided by the MR digital model alignment system. The MR capable device, in some embodiments, includes a forward-facing camera configured to capture digital video or images of the real world around the user, optionally including depth data, which the MR digital model alignment system may analyze to provide some of the MR digital model alignment features described herein.

Turning now to the drawings, systems and methods, including non-routine or unconventional components or operations, or combinations of such components or operations, for aligning a digital model within a video source without using predefined markers in accordance with embodiments of the invention are illustrated. In accordance with an embodiment, FIG. 1A is a diagram of an example MR digital model alignment system 100 and associated devices configured to provide MR digital model alignment system functionality to a user 102. In the example embodiment, the MR digital model alignment system 100 includes a MR digital model alignment device 104, or 'MR alignment device' 104 operated by the user 102 and a MR alignment server device 130 coupled in networked communication with the MR alignment device 104 via a network 150 (e.g., a cellular network, a Wi-Fi network, the Internet, and so forth). The MR alignment device 104 is a computing device capable of providing a mixed reality experience to the user 102.

In the example embodiment, the MR alignment device 104 includes one or more central processing units (CPUs) 106, graphics processing units (GPUs) 108, and/or holographic processing units (HPUs) 110. The processing device 106 is any type of processor, processor assembly comprising multiple processing elements (not shown), having access to a memory 122 to retrieve instructions stored thereon, and execute such instructions. Upon execution of such instructions, the instructions implement the processing device 106 to perform a series of tasks as described herein in reference to FIG. 2, FIG. 3, FIG. 4, and FIG. 5. The MR alignment device 104 also includes one or more networking devices 112 (e.g., wired or wireless network adapters) for communicating across the network 150. The MR alignment device 104 further includes one or more camera devices 114 which may be configured to capture digital video of the real world near the MR alignment device 104 during operation. The MR alignment device 104 may also include one or more sensors 116, such as a global positioning system (GPS) receiver (e.g., for determining a GPS location of the MR alignment device 104), biometric sensors (e.g., for capturing biometric data of the user 102 or an additional person), motion or position sensors (e.g., for capturing position data of the MR alignment device 14, the user 102 or other objects), or an audio microphone (e.g., for capturing sound data). Some sensors 116 may be external to the MR alignment device 104, and may be configured to wirelessly communicate with the MR alignment device 104 (e.g., such as used in the Microsoft Kinect®, Vive Tracker™, MIT's Lidar sensor, or MIT's wireless emotion detector).

The MR alignment device 104 also includes one or more input devices 118 such as, for example, a keyboard or keypad, a mouse, a pointing device, a touchscreen, a handheld device (e.g., hand motion tracking device), a microphone, a camera, and the like, for inputting information in the form of a data signal readable by the processing device 106. The MR alignment device 104 further includes one or more display devices 120, such as a touchscreen of a tablet or smartphone, or lenses or visor of a VR or AR HMD, which may be configured to display virtual objects to the user 102 in conjunction with a real world view.

The MR alignment device 104 also includes a memory 122 configured to store a client MR digital model alignment module ("client module") 124. The memory 122 can be any type of memory device, such as random access memory, read only or rewritable memory, internal processor caches, and the like.

In the example embodiment, the camera device 114 and sensors 116 capture data from the surrounding environment, such as video, audio, depth information, GPS location, and so forth. The client module 124 may be configured to analyze the sensor data directly, or analyze processed sensor data (e.g., a real-time list of detected and identified objects, object shape data, depth maps, and the like).

In accordance with an embodiment, the memory may also store a game engine (e.g., not shown in FIG. 1A) (e.g., executed by the CPU 106 or GPU 108) that communicates with the display device 120 and also with other hardware such as the input/output device(s) 118 to present a 3D simulation environment (e.g., a virtual reality environment, a mixed reality environment, and the like) to the user 102. The game engine would typically include one or more modules that provide the following: simulation of a virtual environment and game objects therein (e.g., including animation of digital objects, animation physics for digital objects, collision detection for digital objects, and the like), rendering of the virtual environment and the digital objects therein, networking, sound, and the like in order to provide the user with a complete or partial virtual environment (e.g., including video game environment or simulation environment).

In accordance with an embodiment, the MR Alignment server 130 includes a memory 132 storing a server MR digital model alignment module ("server module") 134. During operation, the client MR digital model alignment module 124 and the server MR digital model alignment module 134 perform the various MR digital model alignment functionalities described herein. More specifically, in some embodiments, some functionality may be implemented within the client module 124 and other functionality may be implemented within the server module 134.

Figure 1B:
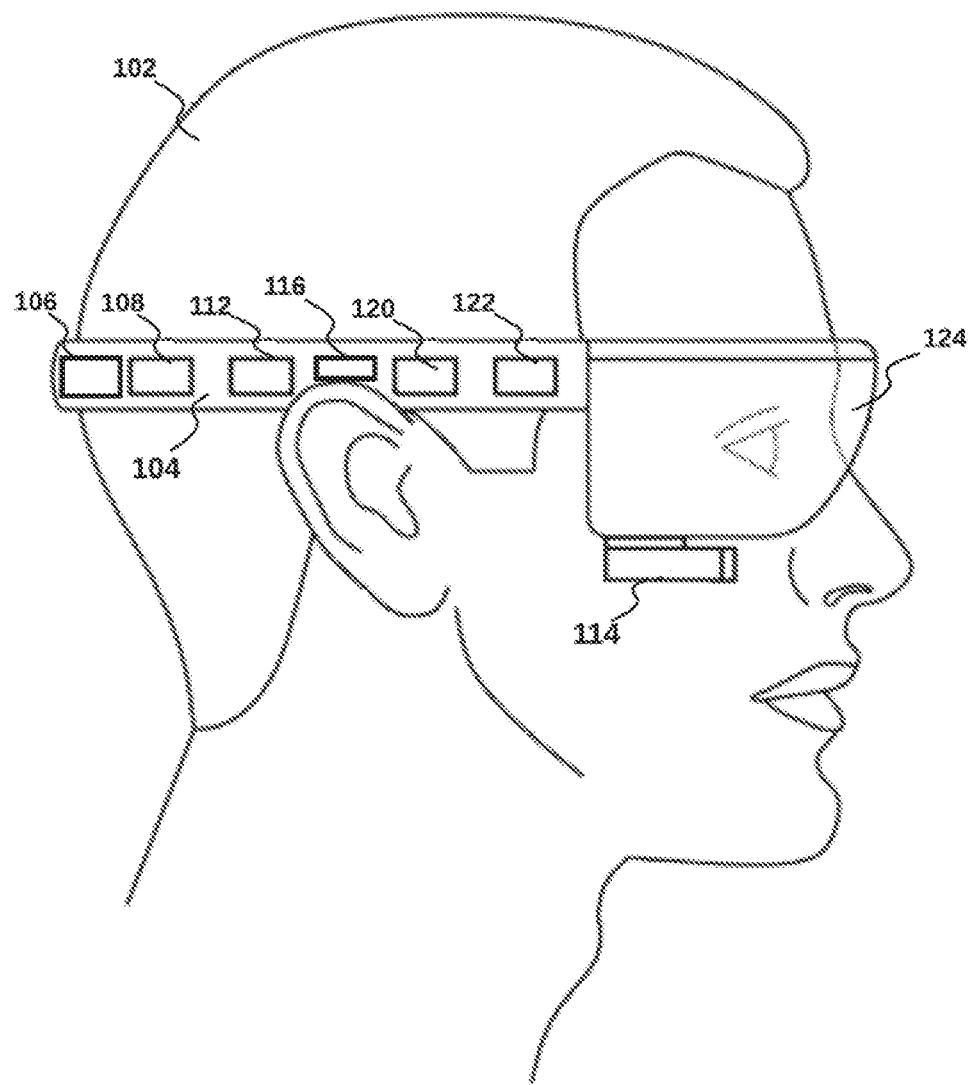
FIG. 1B is a schematic illustrating a head mounted MR digital model alignment device, in accordance with one embodiment.

In accordance with some embodiments, the MR alignment device 104 is a mobile computing device, such as a smartphone or a tablet computer. In accordance with another embodiment, and as shown in FIG. 1B, the MR alignment device 104 may be a head-mounted display (HMD) device worn by the user 102, such as an augmented reality (AR) or virtual reality (VR) visor (e.g., Google Glass®, HTC Vive®, Microsoft HoloLens®, the Playstation VR™, Oculus Rift™, and so forth). In the example embodiment, the user 102 (e.g., a game developer) experiences a VR environment or augmented reality (AR) environment while wearing the HMD MR alignment device 104. During operation, in the example embodiment, the HMD MR alignment device 104 is mounted on a head of the wearer 102, and over both eyes of the wearer 102, as shown in FIG. 1B. The wearer 102 may be presented with a virtual environment which may be viewed and edited via the HMD 104 and handhelds as described herein. The HMD MR alignment device 104 includes a transparent or semi-transparent visor (or "lens" or "lenses") 124 through which the wearer 102 views their surroundings (also herein referred to as "the real world"). In other embodiments, the HMD MR alignment device 104 may include an opaque visor 124 which may obscure the wearer 102's view of the real world and on which a complete virtual environment is displayed (e.g., using video from the camera device 114).

In accordance with an embodiment, the HMD MR alignment device 104 shown in FIG. 1B includes components similar to the MR alignment device 104 discussed in relation to FIG. 1A. For example, the HMD MR alignment device 104 shown in FIG. 1B includes a display device 120, a networking device 112, a camera device 114, a CPU 106, a GPU 108, a memory 122, sensors 116, and one or more input devices 118 (not explicitly shown in FIG. 1B). In the example embodiment, the display device 120 may render graphics (e.g., virtual objects) onto the visor 124. As such, the visor 124 acts as a "screen" or surface on which the output of the display device 120 appears, and through which the wearer 102 experiences virtual content. The display device 120 may be driven or controlled by one or more graphical processing units (GPUs) 108. In accordance with some embodiments, the display device 120 may include the visor 124.

In some embodiments, the digital camera device (or just "camera") 114 on the MR alignment device 104 is a forward-facing video input device that is oriented so as to capture at least a portion of a field of view (FOV) of the wearer 102. In other words, the camera 114 captures or "sees" an angle of view of the real world based on the orientation of the HMD device 104 (e.g., similar to what the wearer 102 sees in the wearer 102's FOV when looking through the visor 124). The camera device 114 may be configured to capture real-world digital video around the wearer 102 (e.g., a field of view, a peripheral view, or a 360° view around the wearer 102). In some embodiments, output from the digital camera device 114 may be projected onto the visor 124 (e.g., in opaque visor embodiments), and may also include additional virtual content (e.g., added to the camera output). In some embodiments there can also be a depth camera on the HMD 104.

In some embodiments, the HMD MR alignment device 104 may include one or more sensors 116, or may be coupled in wired or wireless communication with the sensors. For example, the HMD MR alignment device 104 may include motion or position sensors configured to determine a position or orientation of the HMD 104. In some embodiments, the HMD MR alignment device 104 may include a microphone for capturing audio input (e.g., spoken vocals of the user 102).

In some embodiments, the user 102 may hold one or more input devices 118 including hand tracking devices ("handhelds") (not separately shown in FIG. 1B) (e.g., one in each hand). The handhelds provide information about the absolute or relative position and orientation of a user's hands and, as such, are capable of capturing hand gesture information. The handhelds may be configured to operate directly with the HMD MR alignment device 104 (e.g., via wired or wireless communication). In some embodiments, the handhelds may be Oculus Touch™ hand controllers, HTC Vive™ hand trackers, or Playstation VR™ hand controllers. The handhelds may also include one or more buttons or joysticks built into the handheld. In other embodiments, the user 102 may wear one or more wearable hand tracking devices (e.g., motion tracking gloves, not shown), such as those made commercially available by Manus VR (Netherlands). In still other embodiments, hand motion of the user 102 may be tracked without, or in addition to, the handhelds or wearable hand tracking devices via a hand position sensor (not shown, e.g., using optical methods to track the position and orientation of the user's hands) such as, for example, those made commercially available by Leap Motion, Inc. (a California corporation). Such hand tracking devices (e.g., handhelds) track the position of one or more of the hands of the user during operation.

In accordance with an embodiment, the methods and systems described herein teach how an estimated global position of a device within a structure can be obtained and then refined with a local position by detecting object surfaces in the device surroundings (e.g., via a video of the surroundings) and aligning the object surfaces to digital surfaces present in a digital model representation of the structure. The combination of the global position and local position allows a determination of device position precisely within the structure.

In accordance with another embodiment, a plurality of rays are cast from the determined device position in the digital model of the structure. The intersection of the rays with digital surfaces within the model define a point cloud. Similarly, rays are also cast from a location of the device in a scene observed through a camera on the device to create a point cloud of the device surroundings with respect to the real-world structure as seen by the device camera. The two point clouds are then aligned to compute a translation, a scale, and a rotation needed to align the digital model with the real-world structure.

In accordance with another embodiment, an alignment of vertical axes in the model with gravity and an alignment of lowest horizontal digital surfaces between the model and object surfaces found in the real-world scene reduce a 3D alignment method to a 2D alignment method. In the 2D alignment method, rays are only cast horizontally from the device position both in the digital model and in the scene captured by the camera, wherein the rays produce two point clouds in 2D (e.g., a first associated with the digital model and a second associated with the scene captured by the camera). Aligning the two point clouds in 2D only requires a rotation in one dimension and a translation and scale in two dimensions, making convergence for the alignment more efficient.

In accordance with an embodiment, the methods described below with respect to FIG. 2, FIG. 3, FIG. 4 and FIG. 5 work without motion tracking devices or using image markers within a real-world environment. The methods described with respect to FIG. 2, FIG. 3, FIG. 4 and FIG. 5 allow a user with an MR alignment device 104 to visit a real-world structure for the first time, determine a precise location for the device within the structure, and position a digital model associated with the real-world structure in a video stream generated by the MR alignment device 104.

In accordance with an embodiment, a determination of global position and a determination of local position are performed in two steps complementing each other. An estimated global position of a device is combined with a local geometry alignment method as described with respect to FIG. 2, FIG. 3, FIG. 4 and FIG. 5 in order to align a digital model with a real world structure surrounding the device and compute a precise position of the device within the structure. The global position is used with local geometry matching on a local area of the structure, preventing the method from erroneously finding locations with similar local geometry elsewhere within the structure.

Figure 2:
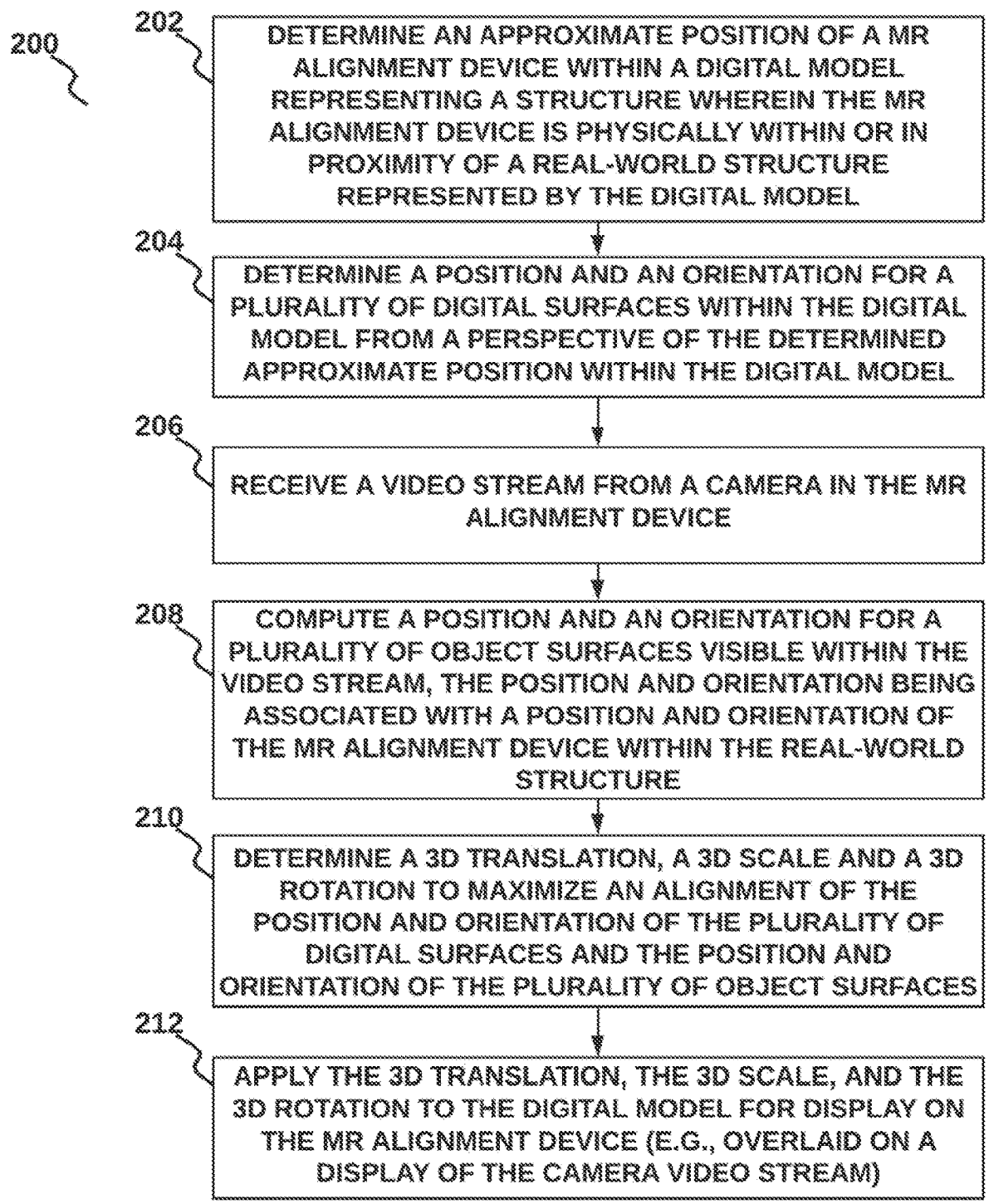
FIG. 2 is a flowchart illustrating a method for aligning a digital model of a structure with a real-world structure using a MR digital model alignment device, in accordance with one embodiment.

In accordance with an embodiment, and as shown in FIG. 2, is a flowchart diagram of a method 200 for aligning a digital model with a real-world structure via a MR alignment device 104. In various embodiments, some of the method elements shown may be performed concurrently, in a different order than shown, or may be omitted. In accordance with an embodiment, at operation 202 of the method 200, the client MR digital model alignment module 124 determines an approximate position for a MR alignment device 104 within a digital model, wherein the digital model represents a real-world structure (e.g., a building) and wherein the MR alignment device 104 is physically within or in proximity of the real-world structure represented by the digital model. In accordance with one embodiment, the approximate position of the MR alignment device 104 can be determined using a Global Positioning System (GPS). For example, receiving a latitude, a longitude, and an altitude for the MR alignment device 104 from a global positioning system and computing a position for the device 104 based on a comparison with a predetermined latitude, longitude, and altitude of a point within the digital model (e.g., included in data describing the digital model). In another embodiment, the approximate position of the MR alignment device 104 can be determined by receiving a touch input from the user 102 on touch a screen (e.g., part of the display device 120) or by receiving an input from the input device 118 (e.g., a pointing device) to indicate the approximate position within a rendering of the digital model displayed on the screen. In accordance with some embodiments, the process of indicating the approximate position using a touch input or an input device may be split into several steps, including: selecting a structure (e.g., a specific building), selecting a first part of the structure (e.g., a floor within a building), and selecting a second part of the structure within the first part (e.g., a room within the floor), and so forth. In accordance with some embodiments, the process of indicating the approximate position using a touch input or an input device can also include a selection of more precise structural elements such as doors, windows, pillars, and walls.

In accordance with an embodiment, at operation 204 of the method 200, the client MR digital model alignment module 124 determines a position and an orientation for a plurality of digital surfaces within the digital model from a perspective of the approximate position (e.g., as determined in operation 202) of the MR alignment device 104 within the digital model.

In accordance with an embodiment, at operation 206 of the method 200, the client MR digital model alignment module 124 receives a video stream (e.g., an RGB video stream) from a camera device 114 in the MR alignment device 104. The video stream may include video of an environment surrounding the MR alignment device 104 (e.g., as the MR alignment device 104 is moved through the environment by a user of the device), wherein the environment includes the real-world structure.

In accordance with an embodiment, at operation 208 of the method 200, the client MR digital model alignment module 124 computes a position and an orientation for a plurality of object surfaces of the real-world structure visible within the video stream, the position and orientation being associated with a position and orientation of the MR alignment device 104 within the real-world structure. In accordance with an embodiment, the position and orientation of object surfaces and the position and orientation of the MR alignment device 104 within the real-world structure are detected in the video stream using a Simultaneous Location And Mapping (SLAM) algorithm. The SLAM algorithm may use data from the sensors 116 (e.g., accelerometer data and gyroscope data) in addition to the video stream data.

In accordance with an embodiment, at operation 210 of the method 200, the client MR digital model alignment module 124 determines a 3D translation, a 3D scale and a 3D rotation to maximize an alignment of the position and orientation of the plurality of digital surfaces (e.g., determined within operation 204) and the position and orientation of the plurality of object surfaces (e.g., determined within operation 208).

In accordance with an embodiment, at operation 212 of the method 200, the client MR digital model alignment module 124 applies the 3D translation, the 3D scale, and the 3D rotation (e.g., determined in operation 210) to the digital model and displays the translated, scaled and rotated digital model on the display device 120 of the MR alignment device 104. In accordance with an embodiment, as part of operation 212, the client MR digital model alignment module 124 overlays the display of the translated, scaled and rotated digital model on a display of the received camera video stream. In accordance with an embodiment, due to the determination of translation, scale and rotation (e.g., from operation 210), some of the plurality of digital surfaces within the digital model (e.g., from operation 204) are aligned in the overlay with associated visible object surfaces (e.g., from operation 208) within the video stream. As such, the displayed overlay of the digital model of the structure aligns with a view of the real-world structure within the video stream.

Figure 3:
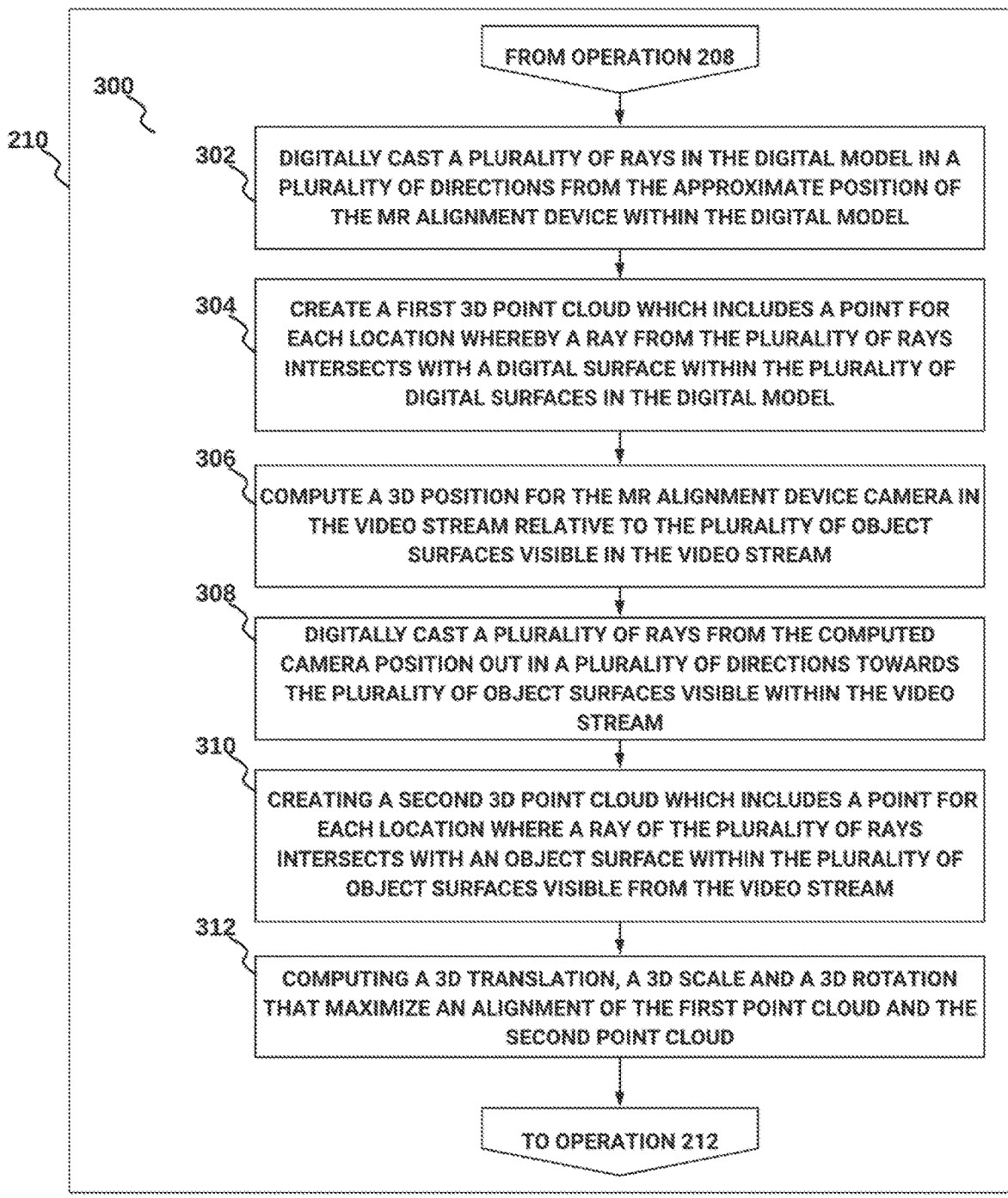
FIG. 3 is a flowchart of a method for computing a 3D translation, a 3D scale and a 3D rotation with an MR digital model alignment system, in accordance with one embodiment.

In accordance with an embodiment, and as shown in FIG. 3, is a flowchart diagram of a method 300 for computing a 3D translation, a 3D scale and a 3D rotation as part of operation 210, wherein the method 300 includes an alignment of two point clouds. In accordance with an embodiment, at operation 302 of the method 300, the client MR digital model alignment module 124 digitally casts a plurality of rays within the digital model in a plurality of directions from the approximate position of the MR alignment device 104 within the digital model (e.g., the approximate position as determined as part of operation 202 of the method 200). In accordance with an embodiment, a ray of the plurality of rays may be cast out to a maximum predetermined distance from the approximate position. At operation 304 of the method 300, the client MR digital model alignment module 124 generates a first 3D point cloud which includes a point for each location whereby a ray from the plurality of rays intersects with a digital surface within the plurality of digital surfaces in the digital model (e.g., the plurality of digital surfaces referred to in operation 204). In accordance with an embodiment, at operation 306 of the method 300, the client MR digital model alignment module 124 computes a 3D position for the MR alignment device 104 (e.g., relative to the camera device 114) in the video stream relative to the plurality of object surfaces visible in the video stream (e.g., the plurality of object surfaces referred to in operation 208). In accordance with an embodiment, at operation 308 of the method 300, the client MR digital model alignment module 124 digitally casts a plurality of rays from the computed camera position (e.g., determined in operation 306) out in a plurality of directions towards the plurality of object surfaces visible within the video stream. In accordance with an embodiment, at operation 310 of the method 300, the client MR digital model alignment module 124 generates a second 3D point cloud which includes a point for each location whereby a ray of the plurality of rays from operation 308 intersects with a object surface within the plurality of object surfaces visible from the video stream. In accordance with an embodiment, at operation 312 of the method 300, the client MR digital model alignment module 124 computes a 3D translation, a 3D scale and a 3D rotation that maximize an alignment of the first point cloud and the second point cloud. In accordance with an embodiment, operation 312 involving an alignment of the first point cloud (e.g., representing digital surfaces within the digital model) with the second point cloud (e.g., representing object surfaces in the real-world structure captured by the camera device 114) may be performed using an ICP (Iterative Closest Point) computation. Embodiments of this present disclosure are not limited in this regard. Any alignment method can be used to align the first point cloud with the second point cloud.

In accordance with an example embodiment, at operation 312 of the method 300, a scale of the digital model may be assumed to be substantially equal to a scale of the real-world scene captured by the camera device 114 (e.g., based on a generation of the digital model using a real-world scale for digital objects therein). In the example embodiment, at operation 312 it is then sufficient to solve only for translation and rotation in order to align the digital model with the real-world scene; accordingly, the client MR digital model alignment module 124 computes a 3D translation and a 3D rotation that maximize an alignment of the first point cloud and the second point cloud.

In accordance with an embodiment, and shown in FIG. 4 and FIG. 5, the 3D alignment determination from operation 210 is reduced to a 2D alignment determination by assuming that one or more lowest horizontal digital surfaces (e.g., determined below in operation 404) in the digital model and that one or more lowest horizontal object surfaces (e.g., determined below in operation 404) in a real-world structure or scene (e.g., as seen via a video) both represent a same floor (e.g., or a ground) and are perpendicular to the direction of gravity and are at the same altitude. With the assumption, rotation is then constrained around an axis of gravity and translation is constrained to be parallel to the horizontal surfaces, solving one dimension of the problem. In example 2D embodiments described with respect to FIG. 4 and FIG. 5, a vertical axis in the digital model of the structure and a vertical axis in the structure within the received video are assumed to be parallel to an axis of gravity. The assumption solves two of the three possible rotation dimensions needed to align the digital model with a structure in reality, leaving a rotation around the axis of gravity as the only rotational degree of freedom.

Figure 4:
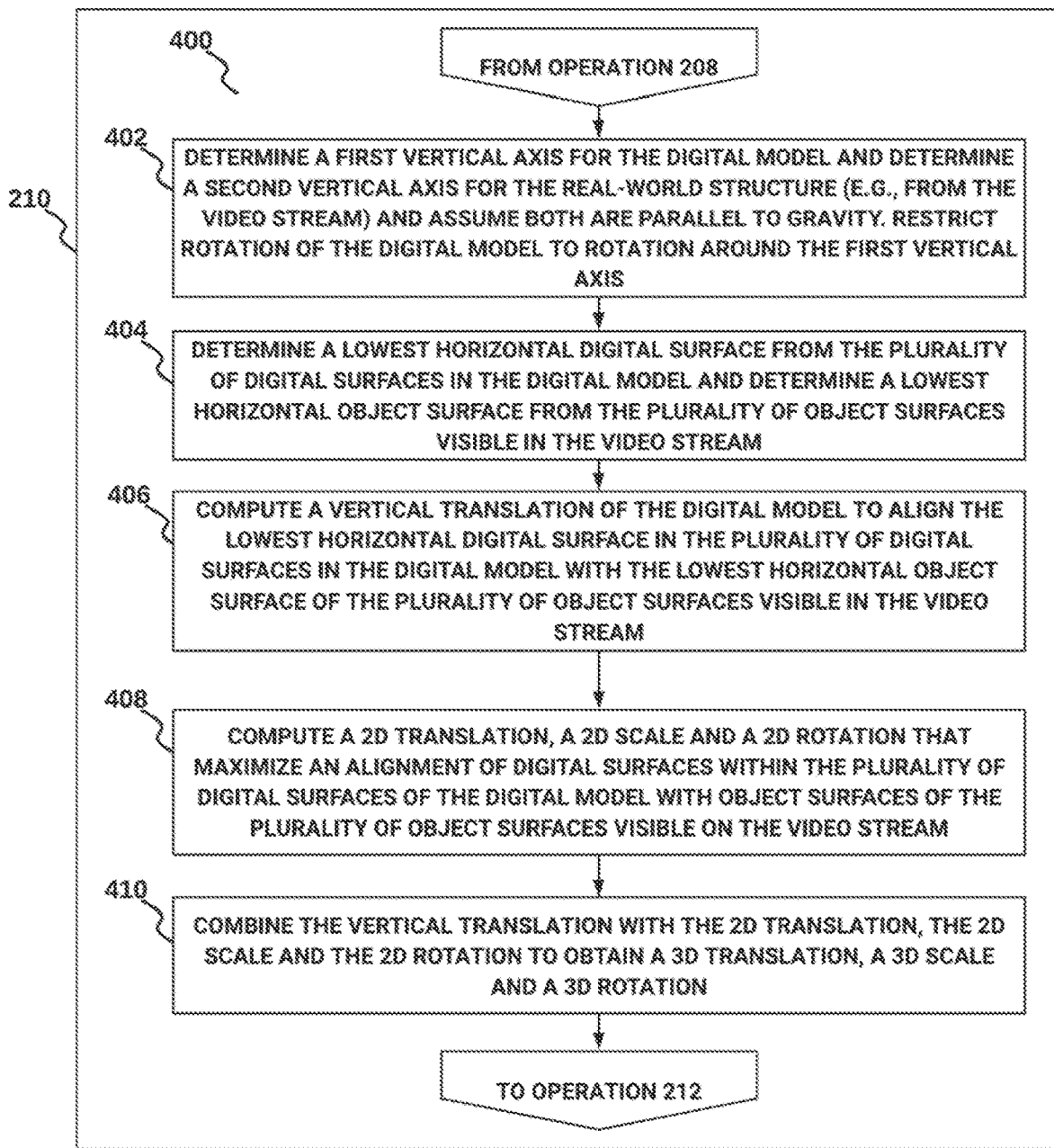
FIG. 4 is a flowchart of a method for computing a 3D translation, a 3D scale and a 3D rotation with an MR digital model alignment system, in accordance with one embodiment.

In accordance with an embodiment, and as shown in FIG. 4, is a flowchart diagram of a method 400 for computing a 3D translation, a 3D scale and a 3D rotation as part of operation 210. In various embodiments, some of the method 400 elements shown may be performed concurrently, in a different order than shown, or may be omitted. In accordance with an embodiment, at operation 402 of the method 400, a first vertical axis is determined for the digital model and a second vertical axis is determined for the real-world structure. In accordance with an embodiment, the second vertical axis may be determined from an analysis of the video stream data received in operation 206, wherein the analysis may include an analysis of the object surfaces visible within the video stream as determined in operation 208. In accordance with an embodiment, the operations of the method 400 are performed with an assumption that the first vertical axis of the digital model and the second vertical axis of the real-world structure are parallel to each other and parallel to the direction of the force of gravity (e.g., the assumption is equivalent to aligning a direction of gravity in both the digital model and the real-world structure such that 'up' and 'down' are aligned in both). In accordance with an embodiment, as part of operation 402 of the method 400, the client MR digital model alignment module 124 restricts rotation of the digital model to a rotation around the first vertical axis. In accordance with an embodiment, at operation 404 of the method 400, the client MR digital model alignment module 124 determines a lowest horizontal digital surface from the plurality of digital surfaces in the digital model (e.g., one or more horizontal digital surfaces which have or share a lowest position as determined in operation 204) and determines a lowest horizontal object surface from the plurality of object surfaces visible in the video stream (e.g., one or more horizontal object surfaces which have or share a lowest position as determined in operation 208). In accordance with an embodiment, operation 404 may be understood as a search for a local floor in both the digital model and the real-world structure. In accordance with an embodiment, at operation 406 of the method 400, the client MR digital model alignment module 124 computes a translation of the digital model so that the lowest horizontal digital surface in the plurality of digital surfaces in the digital model (e.g., as determined in operation 404) is aligned with the lowest horizontal object surface of the plurality of object surfaces visible in the video stream (e.g., as determined in operation 404). In accordance with an embodiment, the translation may be a vertical translation of the digital model such that a floor in the digital model aligns with an associated floor in the real-world structure as seen in the video stream. At operation 408 of the method 400, the client MR digital model alignment module 124 computes a 2D translation, a 2D scale and a 2D rotation that maximize an alignment of digital surfaces within the plurality of digital surfaces of the digital model with object surfaces of the plurality of object surfaces visible on the video stream. In accordance with an embodiment, the optimization of the translation, scale and rotation determined in operation 408 are 2D optimizations due to an alignment of lowest horizontal surfaces (e.g., in operation 406) and an alignment of the first vertical and second vertical axes in operation 402. At operation 410 of the method 400, the client MR digital model alignment module 124 combines the vertical translation determined in operation 406, the alignment of the first and second vertical axes from operation 402, the 2D translation, the 2D scale, and the 2D rotation from operation 408 to obtain a 3D translation, a 3D scale and a 3D rotation.

In accordance with an example embodiment, at operation 408 of the method 400, a scale of the digital model may be assumed to be substantially equal to a scale of the real-world scene captured by the camera device 114 (e.g., based on a creation of the digital model using a real-world scale for digital objects therein). In the example embodiment, at operation 408 of the method 400, it is then sufficient to solve only for translation and rotation in order to align the digital model with the real-world scene; accordingly, the client MR digital model alignment module 124 computes a 2D translation and a 2D rotation that maximize an alignment of digital surfaces within the plurality of digital surfaces of the digital model with object surfaces of the plurality of object surfaces visible on the video stream.

Figure 5:
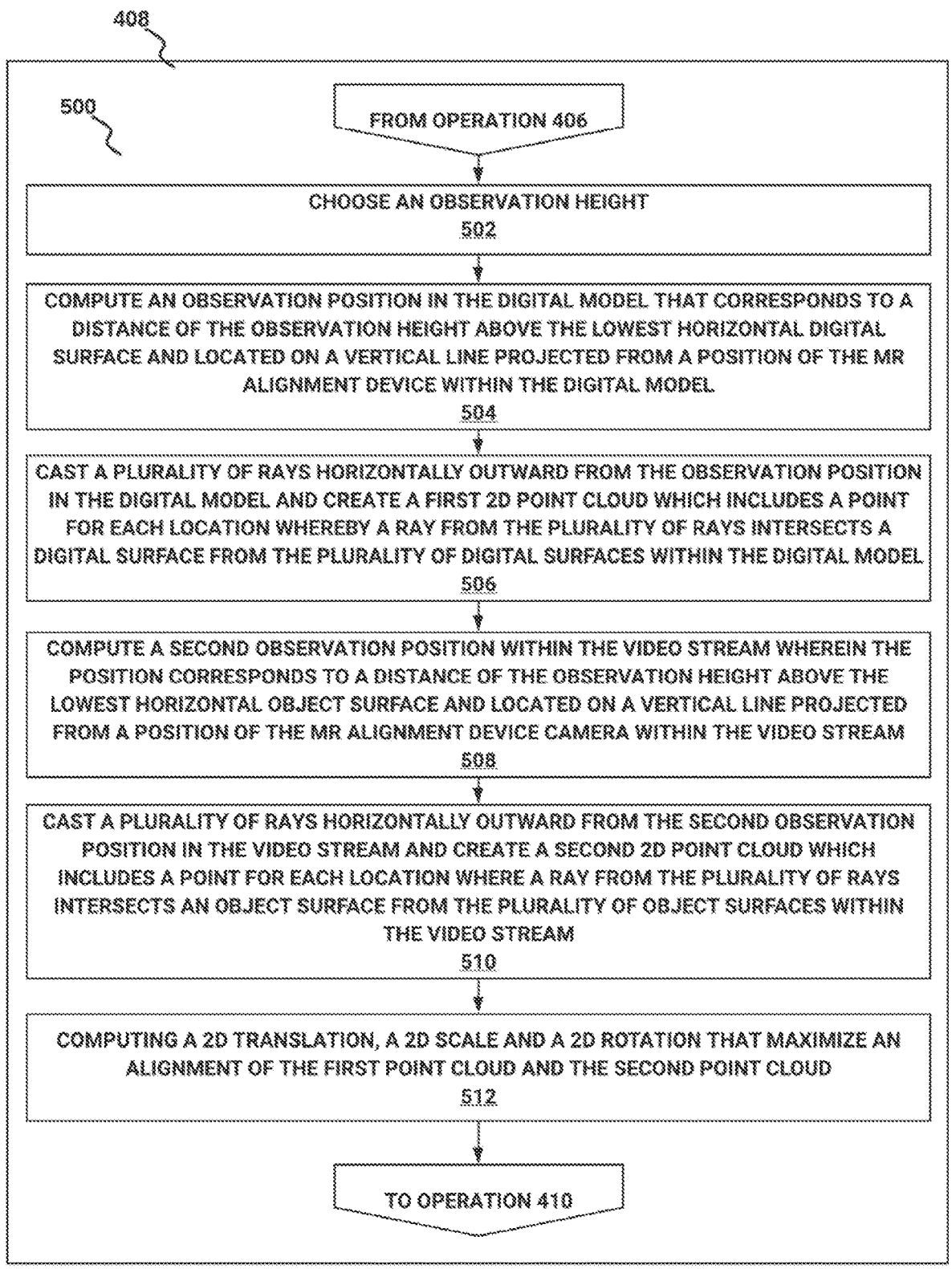
FIG. 5 is a flowchart of a method for computing a 2D translation, a 2D scale and a 2D rotation with an MR digital model alignment system, in accordance with one embodiment.

In accordance with an embodiment, and as shown in FIG. 5, is a flowchart diagram of a method 500 for computing a 2D translation, a 2D scale and a 2D rotation as part of operation 408. In various embodiments, some of the method 500 elements shown may be performed concurrently, in a different order than shown, or may be omitted. In accordance with an embodiment, at operation 502 of the method 500, an observation height is determined, wherein the observation height may correspond to a height of the MR alignment device 104 above a floor in the real-world structure (e.g., or ground) underneath the device 104. In accordance with an embodiment, the observation height may be determined in one of the following ways: taken from a predetermined value (e.g., stored in a memory), received as input from a user (e.g., a value input via an input device 118), determined by an AI agent (e.g., an AI agent trained to determine an observation height), estimated as a height of the MR alignment device 104 above a ground (e.g., or floor) from an analysis of the received video stream data or sensor device 116 data (e.g., as part of operation 202 or 208). In accordance with an embodiment, at operation 504 of the method 500, the client MR digital model alignment module 124 computes an observation position in the digital model that corresponds to a distance of the observation height above the lowest horizontal digital surface (e.g., the lowest horizontal digital surface as determined in operation 404) and located on a line projected vertically (e.g., upward or downward) from the position of the MR alignment device 104 within the digital model (e.g., the position as determined in operation 202). In accordance with an embodiment, at operation 506 of the method 500, the client MR digital model alignment module 124 casts (e.g., digitally projects) a plurality of rays horizontally outward from the observation position in the digital model and creates a first 2D point cloud which includes a point for each location whereby a ray from the plurality of rays intersects a digital surface from the plurality of digital surfaces within the digital model (e.g., wherein the digital surfaces may be determined in operation 204). In accordance with an embodiment, a ray may be cast outward by a predetermined distance and may be removed from calculations in other operations if no intersection with a digital surface occurs along the distance. In accordance with an embodiment, at operation 508 of the method 500, the client MR digital model alignment module 124 computes a second observation position in the video stream (e.g., within a coordinate system associated with the video stream) wherein the position corresponds to a distance of the observation height above the lowest horizontal object surface (e.g., the lowest horizontal object surface as determined in operation 404) and located on a line projected vertically (e.g., upward or downward) from a position associated with the MR alignment device 104 camera within the video stream (e.g., the position as determined in operation 208). In accordance with an embodiment, at operation 510 of the method 500, the client MR digital model alignment module 124 casts (e.g., digitally projects) a second plurality of rays horizontally outward from the second observation position in the video stream and creates a second 2D point cloud which includes a point for each location whereby a ray from the second plurality of rays intersects an object surface from the plurality of object surfaces within the video stream (e.g., wherein the object surfaces may be determined within operation 208). In accordance with an embodiment, at operation 512 of the method 500, the client MR digital model alignment module 124 computes a 2D translation, a 2D scale, and a 2D rotation that maximize an alignment of the first point cloud and the second point cloud. In accordance with an embodiment, operation 512 involving an alignment of the first point cloud (e.g., representing digital surfaces within the digital model) with the second point cloud (e.g., representing object surfaces in the real-world structure captured by the camera device 114) may be performed using an ICP (Iterative Closest Point) computation. Embodiments of this present disclosure are not limited in this regard. Any alignment method can be used to align the first point cloud with the second point cloud.

In accordance with an example embodiment, at operation 512 in the method 500, a scale of the digital model may be assumed to be substantially equal to a scale of the real-world scene captured by the camera device 114 (e.g., based on a generation of the digital model using a real-world scale for digital objects therein). In the example embodiment, at operation 512 of the method 500, it is then sufficient to solve only for translation and rotation in order to align the model with the real-world scene; accordingly, the client MR digital model alignment module 124 computes a 2D translation and a 2D rotation that maximize an alignment of the first point cloud and the second point cloud.

While illustrated in the block diagrams as groups of discrete components communicating with each other via distinct data signal connections, it will be understood by those skilled in the art that the various embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present various embodiments.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. Such software may at least temporarily transform the general-purpose processor into a special-purpose processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 6:
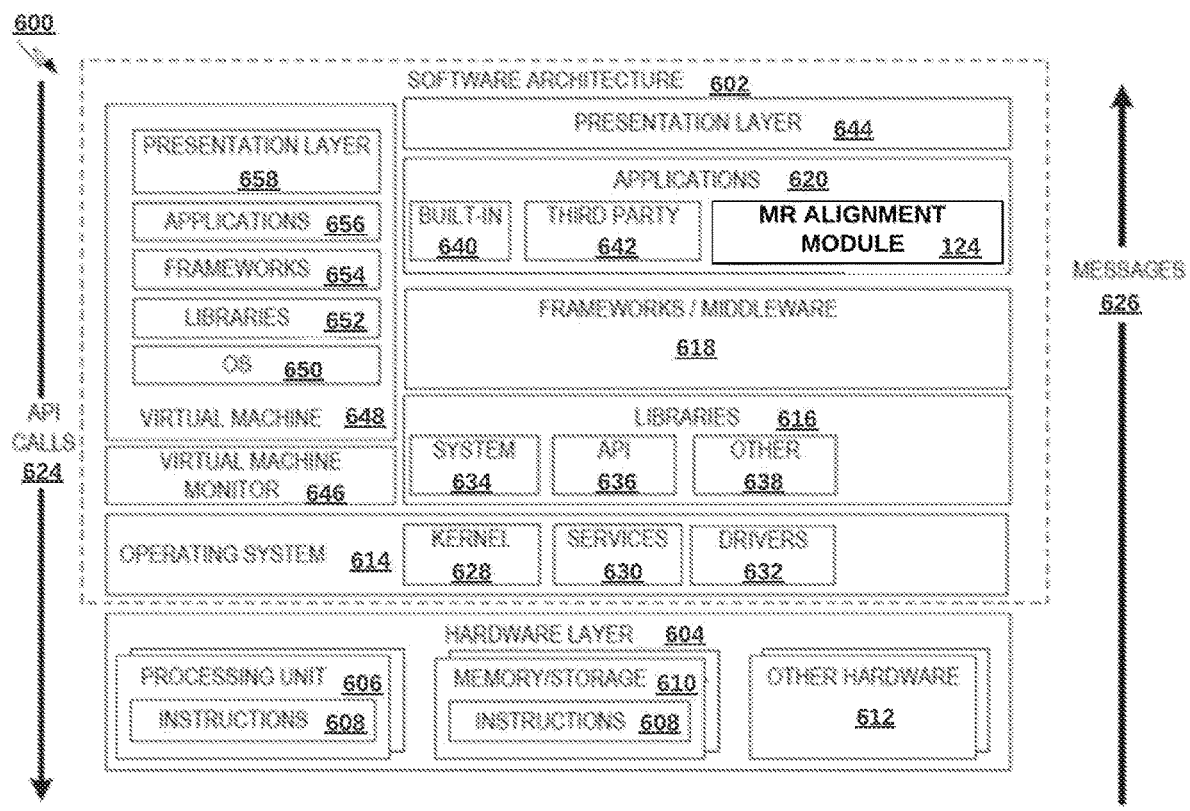
FIG. 6 is a block diagram illustrating an example software architecture, which may be used in conjunction with various hardware architectures described herein.

FIG. 6 is a block diagram 600 illustrating an example software architecture 602, which may be used in conjunction with various hardware architectures herein described to provide components of the MR digital model alignment system 100. FIG. 6 is a non-limiting example of a software architecture and it will be appreciated that many other architectures may be implemented to facilitate the functionality described herein. The software architecture 602 may execute on hardware such as a machine 700 of FIG. 7 that includes, among other things, processors 710, memory 730, and input/output (I/O) components 750. A representative hardware layer 604 is illustrated and can represent, for example, the machine 700 of FIG. 7. The representative hardware layer 604 includes a processing unit 606 having associated executable instructions 608. The executable instructions 608 represent the executable instructions of the software architecture 602, including implementation of the methods, modules and so forth described herein. The hardware layer 604 also includes memory/storage 610, which also includes the executable instructions 608. The hardware layer 604 may also comprise other hardware 612.

In the example architecture of FIG. 6, the software architecture 602 may be conceptualized as a stack of layers where each layer provides particular functionality. For example, the software architecture 602 may include layers such as an operating system 614, libraries 616, frameworks or middleware 618, applications 620 and a presentation layer 644. Operationally, the applications 620 and/or other components within the layers may invoke application programming interface (API) calls 624 through the software stack and receive a response as messages 626. The layers illustrated are representative in nature and not all software architectures have all layers. For example, some mobile or special purpose operating systems may not provide the frameworks/middleware 618, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 616 may provide a common infrastructure that may be used by the applications 620 and/or other components and/or layers. The libraries 616 typically provide functionality that allows other software modules to perform tasks in an easier fashion than to interface directly with the underlying operating system 614 functionality (e.g., kernel 628, services 630 and/or drivers 632). The libraries 716 may include system libraries 634 (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 620 and other software components/modules.

The frameworks 618 (also sometimes referred to as middleware) provide a higher-level common infrastructure that may be used by the applications 620 and/or other software components/modules. For example, the frameworks/middleware 618 may provide various graphic user interface (GUI) functions, high-level resource management, high-level location services, and so forth. The frameworks/middleware 618 may provide a broad spectrum of other APIs that may be utilized by the applications 620 and/or other software components/modules, some of which may be specific to a particular operating system or platform.

The applications 620 include built-in applications 640 and/or third-party applications 642. Examples of representative built-in applications 640 may include, but are not limited to, a contacts application, a browser application, a book reader application, a location application, a media application, a messaging application, and/or a game application. Third-party applications 642 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 642 may invoke the API calls 624 provided by the mobile operating system such as operating system 614 to facilitate functionality described herein.

The applications 620 may use built-in operating system functions (e.g., kernel 628, services 630 and/or drivers 632), libraries 616, or frameworks/middleware 618 to create user interfaces to interact with users of the system. Alternatively, or additionally, in some systems, interactions with a user may occur through a presentation layer, such as the presentation layer 644. In these systems, the application/module "logic" can be separated from the aspects of the application/module that interact with a user.

Some software architectures use virtual machines. In the example of FIG. 6, this is illustrated by a virtual machine 648. The virtual machine 648 creates a software environment where applications/modules can execute as if they were executing on a hardware machine (such as the machine 700 of FIG. 7, for example). The virtual machine 648 is hosted by a host operating system (e.g., operating system 614) and typically, although not always, has a virtual machine monitor 646, which manages the operation of the virtual machine 648 as well as the interface with the host operating system (i.e., operating system 614). A software architecture executes within the virtual machine 648 such as an operating system (OS) 650, libraries 652, frameworks 654, applications 656, and/or a presentation layer 658. These layers of software architecture executing within the virtual machine 648 can be the same as corresponding layers previously described or may be different.

Figure 7:
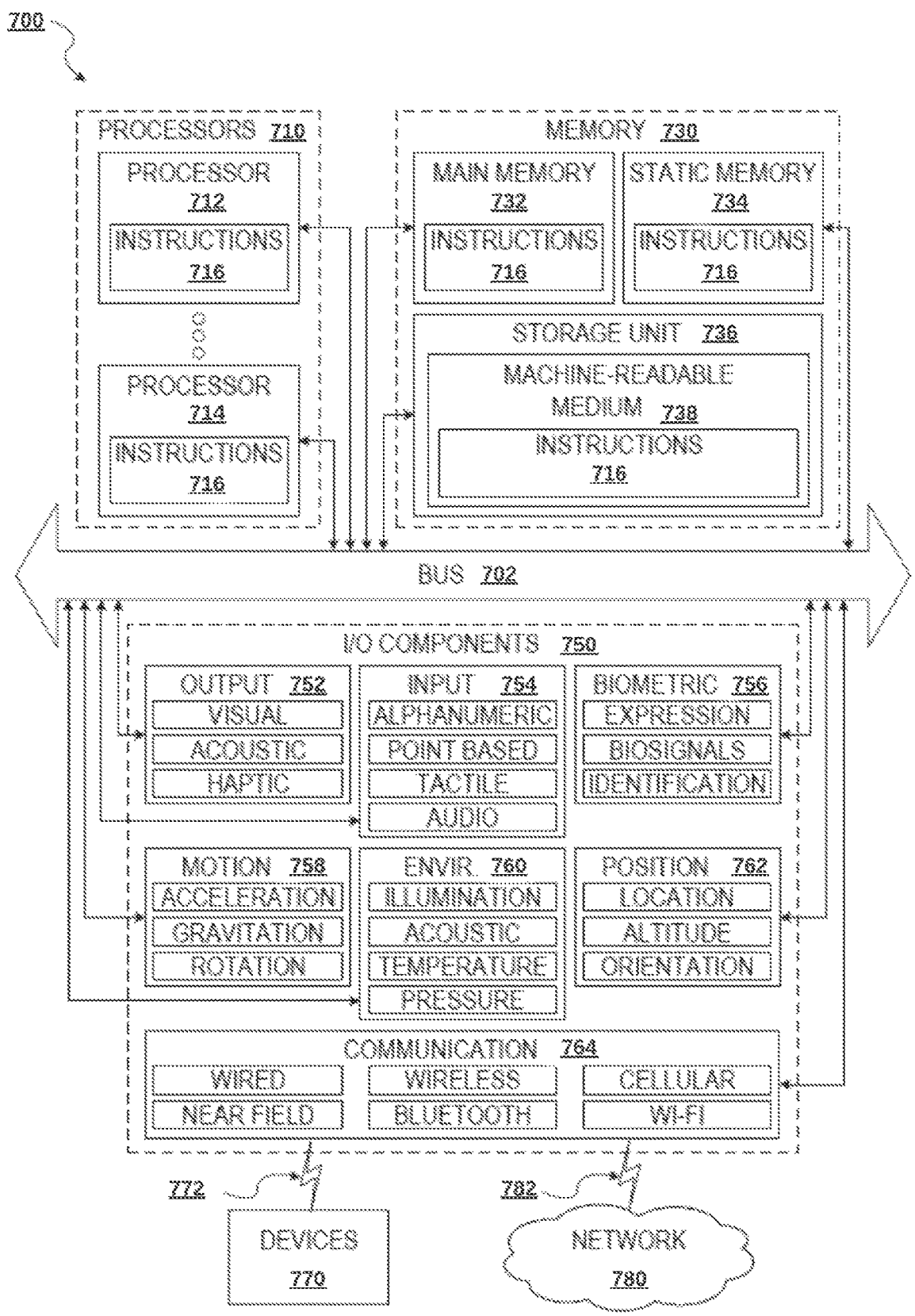
FIG. 7 is a block diagram illustrating components of a machine, according to some example embodiments, configured to read instructions from a machine-readable medium (e.g., a machine-readable storage medium) and perform any one or more of the methodologies discussed herein.

FIG. 7 is a block diagram illustrating components of a machine 700, according to some example embodiments, configured to read instructions from a machine-readable medium (e.g., a machine-readable storage medium) and perform any one or more of the methodologies discussed herein. In some embodiments, the machine 700 is similar to the MR alignment device 104. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. As such, the instructions 716 may be used to implement modules or components described herein. The instructions transform the general, non-programmed machine into a particular machine programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines that individually or jointly execute the instructions 716 to perform any one or more of the methodologies discussed herein.

The machine 700 may include processors 710, memory 730, and input/output (I/O) components 750, which may be configured to communicate with each other such as via a bus 702. In an example embodiment, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 712 and a processor 714 that may execute the instructions 716. The term "processor" is intended to include multi-core processor that may comprise two or more independent processors (sometimes referred to as "cores") that may execute instructions contemporaneously. Although FIG. 7 shows multiple processors, the machine 700 may include a single processor with a single core, a single processor with multiple cores (e.g., a multi-core processor), multiple processors with a single core, multiple processors with multiples cores, or any combination thereof.

The memory/storage 730 may include a memory, such as a main memory 732, a static memory 734, or other memory, and a storage unit 736, both accessible to the processors 710 such as via the bus 702. The storage unit 736 and memory 732, 734 store the instructions 716 embodying any one or more of the methodologies or functions described herein. The instructions 716 may also reside, completely or partially, within the memory 732, 734, within the storage unit 736, within at least one of the processors 710 (e.g., within the processor's cache memory), or any suitable combination thereof, during execution thereof by the machine 700. Accordingly, the memory 732, 734, the storage unit 736, and the memory of processors 710 are examples of machine-readable media 738.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions, when executed by one or more processors of the machine 700 (e.g., processors 710), cause the machine 700 to perform any one or more of the methodologies or operations, including non-routine or unconventional methodologies or operations, or non-routine or unconventional combinations of methodologies or operations, described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 750 may include a wide variety of components to receive input, provide output, produce output, transmit information, exchange information, capture measurements, and so on. The specific input/output (I/O) components 750 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 750 may include many other components that are not shown in FIG. 7. The input/output (I/O) components 750 are grouped according to functionality merely for simplifying the following discussion and the grouping is in no way limiting. In various example embodiments, the input/output (I/O) components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 750 may include communication components 764 operable to couple the machine 700 to a network 780 or devices 770 via a coupling 782 and a coupling 772 respectively. For example, the communication components 764 may include a network interface component or other suitable device to interface with the network 780. In further examples, the communication components 764 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a Universal Serial Bus (USB)).

Moreover, the communication components 764 may detect identifiers or include components operable to detect identifiers. For example, the communication components 764 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 762, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

I claim:

1. A system comprising:
   one or more computer processors;
   one or more computer memories;
   a set of instructions incorporated into the one or more computer memories, the set of instructions configuring the one or more computer processors to perform operations for aligning a digital model of a structure with a displayed portion of the structure within a video stream captured by a camera device, the operations comprising:
   determining an approximate position of the camera device in the digital model;
   determining a position and an orientation for a plurality of digital surfaces within the digital model visible from the approximate position of the camera device;
   receiving a video stream from the camera device;
   determining a position and an orientation of a plurality of object surfaces visible in the video stream;
   determining a 3D translation, a 3D scale, and a 3D rotation that maximize an alignment of the position and orientation of the plurality of digital surfaces with the position and orientation of the plurality of object surfaces, wherein the plurality of the digital surfaces includes a determined lowest horizontal digital surface and at least two vertical digital surfaces and the object surfaces visible on the video stream include a determined lowest horizontal object surface and at least two vertical object surfaces, wherein the determining of the 3D translation, the 3D scale, and the 3D rotation comprises limiting a rotation of the digital model around the first vertical axis and determining a vertical translation of the digital model so that the lowest horizontal digital surface is aligned with the lowest horizontal object surface visible on the video stream, determining a 2D translation, a 2D scale, and a 2D rotation that maximize an alignment of the vertical digital surfaces of the digital model with the vertical object surfaces visible on the video stream, combining the vertical translation and the limiting of rotation with the 2D translation, the 2D scale, and the 2D rotation to obtain the 3D translation, the 3D scale, and the 3D rotation, and wherein the determining of the 3D translation, the 3D scale, and the 3D rotation further comprises determining an observation height above a floor, determining an observation position in the digital model that corresponds to a distance of the observation height above the lowest horizontal digital surface and located on a line projected vertically from the position of the camera device within the digital model, casting a plurality of rays horizontally from the observation position in the digital model and creating a first 2D point cloud including a point for each location whereby a ray from the plurality of rays intersects with a vertical digital surface, determining a second observation position in the video stream that corresponds to a distance of the observation height above the lowest horizontal object surface and located on a line projected vertically from a position associated with the camera device within the video stream, casting a plurality of rays horizontally from the second observation position and creating a second 2D point cloud including a point for each location whereby a ray from the plurality of rays intersects a vertical object surface, and determining the 2D translation, the 2D scale, and the 2D rotation that maximize an alignment of the first point cloud and the second point cloud; and applying the 3D translation, the 3D scale, and the 3D rotation to the digital model and displaying the digital model contemporaneously with a display of the video stream.

2. The system of claim 1, wherein the approximate position of the camera device in the digital model is estimated by performing one or more of the following:

receiving input data from an input device, wherein the input data describes the approximate position in the digital model; and receiving a latitude, a longitude, and an altitude from a global positioning system and computing the camera device position based on a comparison with a predetermined latitude, longitude, and altitude of a point within the digital model.

3. The system of claim 1, wherein the determining of the 3D translation, the 3D scale, and the 3D rotation comprises:

digitally projecting a first plurality of rays in a plurality of directions from the approximate position of the camera device outwards in the digital model and creating a first 3D point cloud including a point for each location whereby a ray from the first plurality of rays intersects with a digital surface of the plurality of digital surfaces;

determining a camera device position in the video stream;

digitally projecting a second plurality of rays in a plurality of directions from the determined position of the camera device within the video stream outwards in the video stream data and creating a second 3D point cloud including a point for each location whereby a ray of the second plurality of rays intersects with an object surface within the plurality of object surfaces; and determining a 3D translation, a 3D scale, and a 3D rotation that maximize an alignment of the first point cloud and the second point cloud.

4. The system of claim 1, wherein the computing of the 3D translation, the 3D scale, and the 3D rotation comprises: based on an assumption that a scale of the structure is substantially equal to a scale of the digital model, reducing the computing to a determination of the 3D translation and the 3D rotation only.

5. A non-transitory computer-readable storage medium storing a set of instructions that, when executed by one or more computer processors, causes the one or more computer processors to perform operations for aligning a digital model of a structure with a displayed portion of the structure within a video stream captured by a camera device, the operations comprising:

determining an approximate position of the camera device in the digital model;

determining a position and an orientation for a plurality of digital surfaces within the digital model visible from the approximate position of the camera device;

receiving a video stream from the camera device;

determining a position and an orientation of a plurality of object surfaces visible in the video stream;

determining a 3D translation, a 3D scale, and a 3D rotation that maximize an alignment of the position and orientation of the plurality of digital surfaces with the position and orientation of the plurality of object surfaces, wherein the plurality of the digital surfaces includes a determined lowest horizontal digital surface and at least two vertical digital surfaces and the object surfaces visible on the video stream include a determined lowest horizontal object surface and at least two vertical object surfaces, wherein the determining of the 3D translation, the 3D scale, and the 3D rotation comprises limiting a rotation of the digital model around the first vertical axis and determining a vertical translation of the digital model so that the lowest horizontal digital surface is aligned with the lowest horizontal object surface visible on the video stream, determining a 2D translation, a 2D scale, and a 2D rotation that maximize an alignment of the vertical digital surfaces of the digital model with the vertical object surfaces visible on the video stream, combining the vertical translation and the limiting of rotation with the 2D translation, the 2D scale, and the 2D rotation to obtain the 3D translation, the 3D scale, and the 3D rotation, and wherein the determining of the 3D translation, the 3D scale, and the 3D rotation further comprises determining an observation height above a floor, determining an observation position in the digital model that corresponds to a distance of the observation height above the lowest horizontal digital surface and located on a line projected vertically from the position of the camera device within the digital model, casting a plurality of rays horizontally from the observation position in the digital model and creating a first 2D point cloud including a point for each location whereby a ray from the plurality of rays intersects with a vertical digital surface, determining a second observation position in the video stream that corresponds to a distance of the observation height above the lowest horizontal object surface and located on a line projected vertically from a position associated with the camera device within the video stream, casting a plurality of rays horizontally from the second observation position and creating a second 2D point cloud including a point for each location whereby a ray from the plurality of rays intersects a vertical object surface, and determining the 2D translation, the 2D scale, and the 2D rotation that maximize an alignment of the first point cloud and the second point cloud; and applying the 3D translation, the 3D scale, and the 3D rotation to the digital model and displaying the digital model contemporaneously with a display of the video stream.

6. The non-transitory computer-readable storage medium of claim 5, wherein the approximate position of the camera device in the digital model is estimated by performing one or more of the following:
receiving input data from an input device, wherein the input data describes the approximate position in the digital model; and
receiving a latitude, a longitude, and an altitude from a global positioning system and computing the camera device position based on a comparison with a predetermined latitude, longitude, and altitude of a point within the digital model.

7. The non-transitory computer-readable storage medium of claim 5, wherein the determining the 3D translation, the 3D scale, and the 3D rotation comprises:
digitally projecting a first plurality of rays in a plurality of directions from the approximate position of the camera device outwards in the digital model and creating a first 3D point cloud including a point for each location whereby a ray from the first plurality of rays intersects with a digital surface of the plurality of digital surfaces;
determining a camera device position in the video stream;
digitally projecting a second plurality of rays in a plurality of directions from the approximate position of the camera device outwards in the video stream data and creating a second 3D point cloud including a point for each location whereby a ray of the second plurality of rays intersects with an object surface within the plurality of object surfaces; and
determining the 3D translation, the 3D scale, and the 3D rotation that maximize an alignment of the first point cloud and the second point cloud.

8. The non-transitory computer-readable storage medium of claim 5, wherein the computing of the 3D translation, the 3D scale, and the 3D rotation comprises:
based on an assumption that a scale of the structure is substantially equal to a scale of the digital model, reducing the computing to a determination of a 3D translation and a 3D rotation only.

9. A method of aligning a digital model of a structure with a displayed portion of the structure within a video stream captured by a camera device, the method comprising:
determining an approximate position of the camera device in the digital model;
determining a position and an orientation for a plurality of digital surfaces within the digital model visible from the approximate position of the camera device;
receiving a video stream from the camera device;
determining a position and an orientation of a plurality of object surfaces visible in the video stream;
determining a 3D translation, a 3D scale, and a 3D rotation that maximize an alignment of the position and orientation of the plurality of digital surfaces with the position and orientation of the plurality of object surfaces, wherein the plurality of the digital surfaces includes a determined lowest horizontal digital surface and at least two vertical digital surfaces and the object surfaces visible on the video stream include a determined lowest horizontal object surface and at least two vertical object surfaces, wherein the determining of the 3D translation, the 3D scale, and the 3D rotation comprises limiting a rotation of the digital model around the first vertical axis and determining a vertical translation of the digital model so that the lowest horizontal digital surface is aligned with the lowest horizontal object surface visible on the video stream, determining a 2D translation, a 2D scale, and a 2D rotation that maximize an alignment of the vertical digital surfaces of the digital model with the vertical object surfaces visible on the video stream, combining the vertical translation and the limiting of rotation with the 2D translation, the 2D scale, and the 2D rotation to obtain the 3D translation, the 3D scale, and the 3D rotation, and wherein the determining of the 3D translation, the 3D scale, and the 3D rotation further comprises determining an observation height above a floor, determining an observation position in the digital model that corresponds to a distance of the observation height above the lowest horizontal digital surface and located on a line projected vertically from the position of the camera device within the digital model, casting a plurality of rays horizontally from the observation position in the digital model and creating a first 2D point cloud including a point for each location whereby a ray from the plurality of rays intersects with a vertical digital surface, determining a second observation position in the video stream that corresponds to a distance of the observation height above the lowest horizontal object surface and located on a line projected vertically from a position associated with the camera device within the video stream, casting a plurality of rays horizontally from the second observation position and creating a second 2D point cloud including a point for each location whereby a ray from the plurality of rays intersects a vertical object surface, and determining the 2D translation, the 2D scale, and the 2D rotation that maximize an alignment of the first point cloud and the second point cloud; and
applying the 3D translation, the 3D scale, and the 3D rotation to the digital model and displaying the digital model contemporaneously with a display of the video stream.

10. The method of claim 9, wherein the approximate position of the camera device in the digital model is estimated by performing one or more of the following:
receiving input data from an input device, wherein the input data describes the approximate position in the digital model; and
receiving a latitude, a longitude, and an altitude from a global positioning system and computing the camera device position based on a comparison with a predetermined latitude, longitude, and altitude of a point within the digital model.

11. The method of claim 9, wherein the determining of the 3D translation, the 3D scale, and the 3D rotation comprises:
digitally projecting a first plurality of rays in a plurality of directions from the determined position of the camera device within the video stream outwards in the digital model and creating a first 3D point cloud including a point for each location whereby a ray from the first plurality of rays intersects with a digital surface of the plurality of digital surfaces;
determining a camera device position in the video stream;
digitally projecting a second plurality of rays in a plurality of directions from the determined position of the camera device within the video stream outwards in the video stream data and creating a second 3D point cloud including a point for each location whereby a ray of the second plurality of rays intersects with an object surface within the plurality of object surfaces; and determining a 3D translation, a 3D scale, and a 3D rotation that maximize an alignment of the first point cloud and the second point cloud.

\* \* \* \* \*